Figure 1:
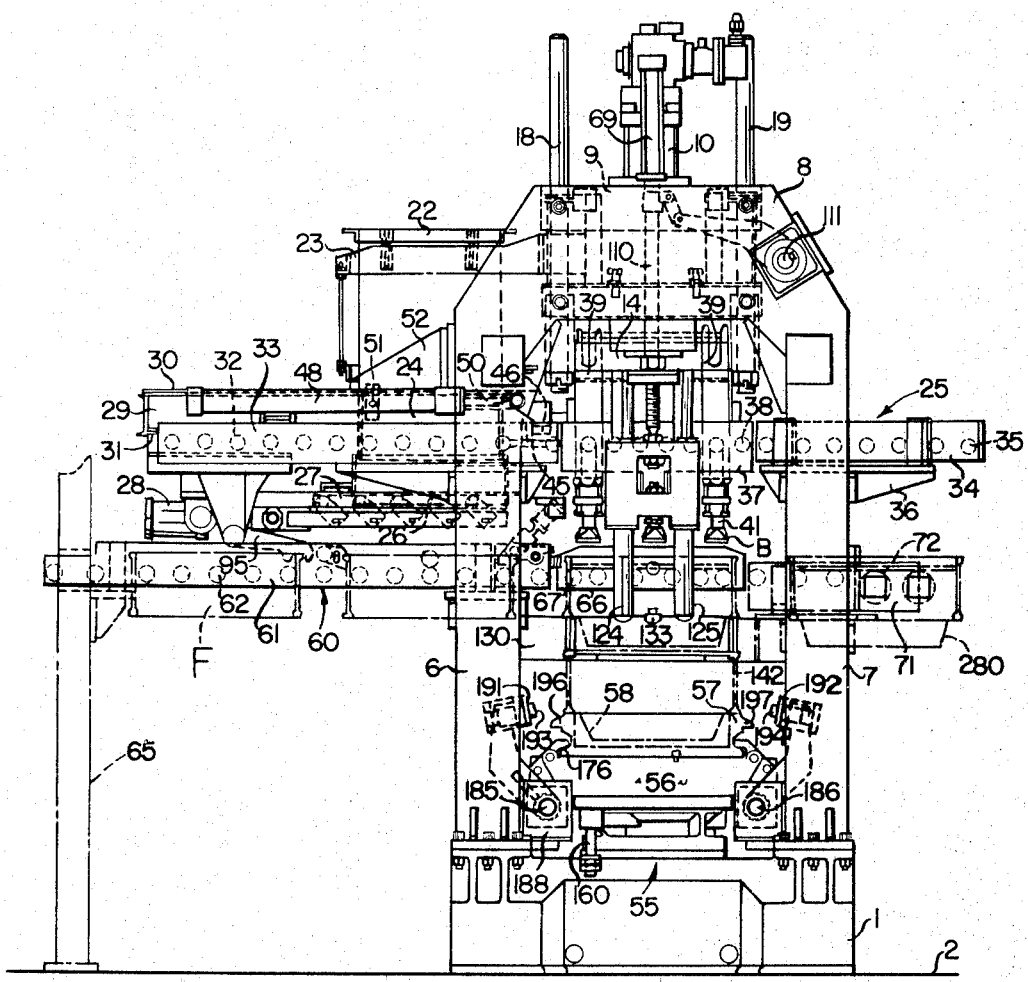

INVENTOR.
EDMOND K. HATCH &
LEON F. MILLER.
BY
Oberlin, Maky & Donnelly
ATTORNEYS

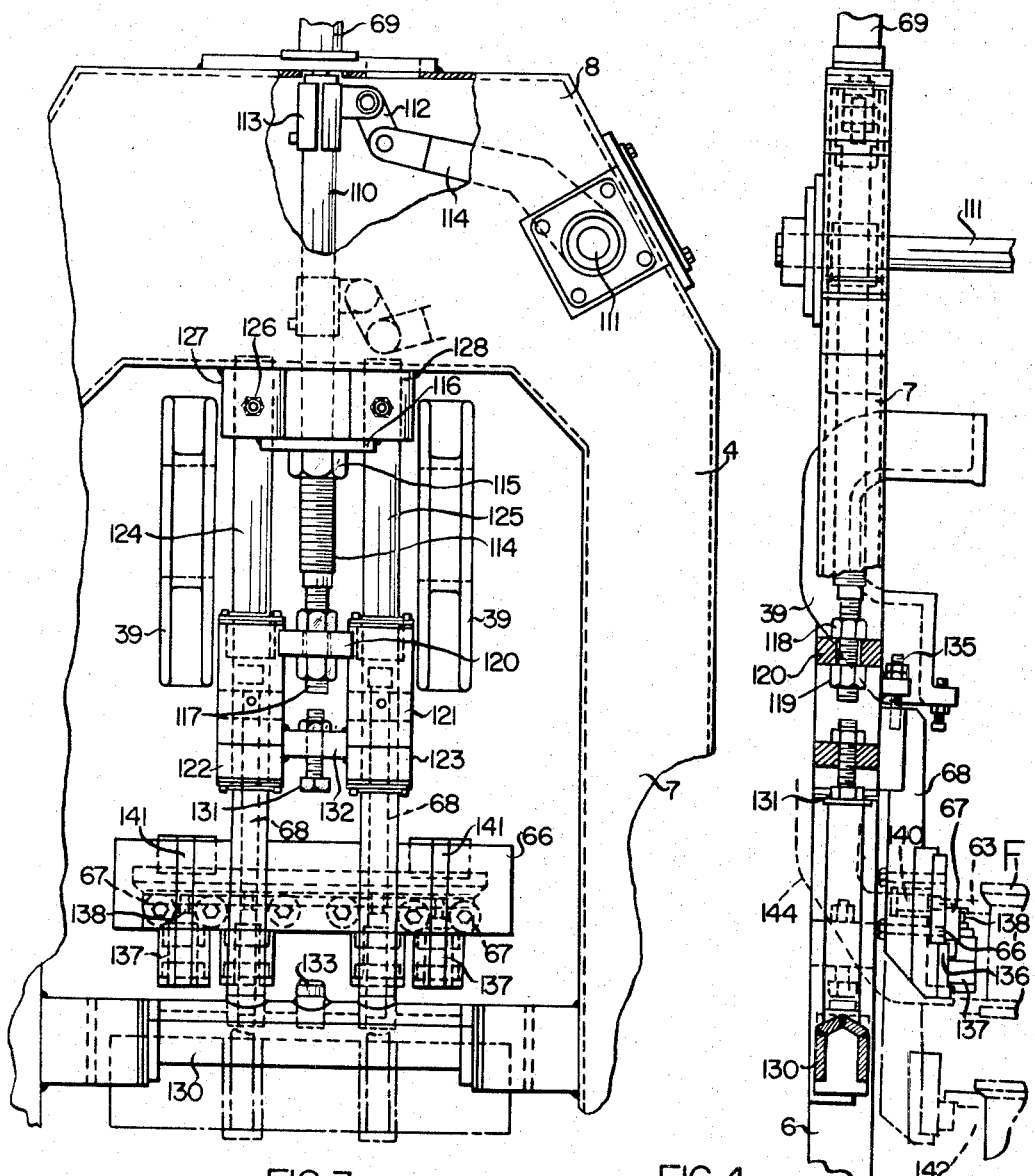

INVENTOR.
EDMOND K. HATCH &
LEON F. MILLER
BY
Oberlin, Maky & Donnelly
ATTORNEYS Oct. 17, 1967  E. K. HATCH ETAL  3,347,307
PNEUMATIC SQUEEZE HEAD WITH PRESSURE SUPPLY BOOSTER MEANS
Original Filed Dec. 11, 1961  6 Sheets-Sheet 5

INVENTOR
EDMOND K. HATCH &
BY LEON F. MILLER

*Oberlin, Maky & Donnelly*
ATTORNEYS

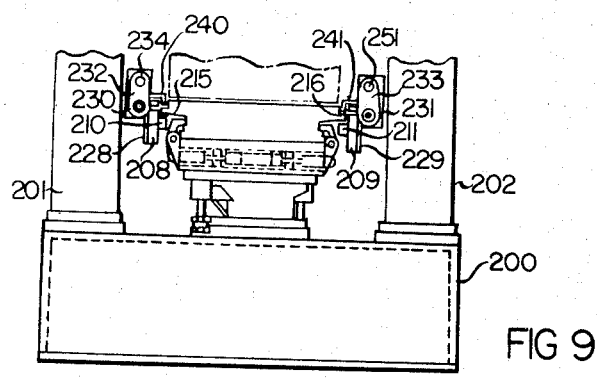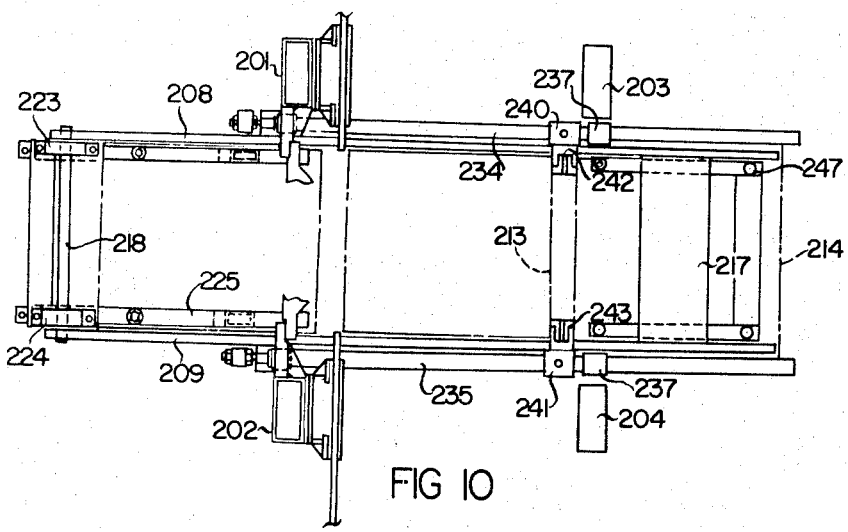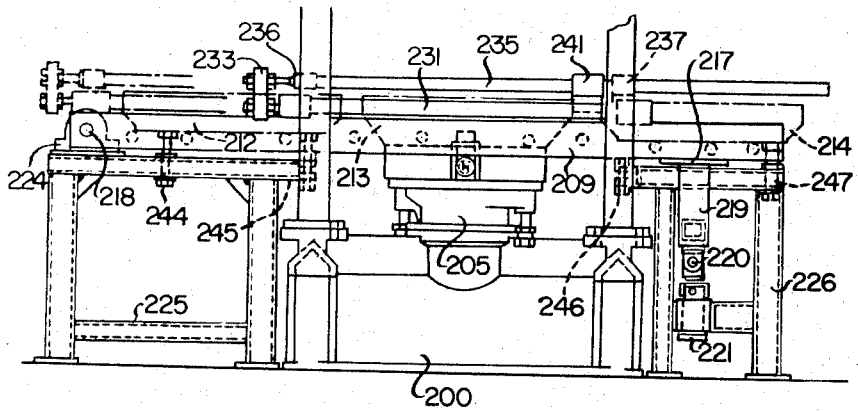

United States Patent Office 3,347,307
Patented Oct. 17, 1967

3,347,307
PNEUMATIC SQUEEZE HEAD WITH PRESSURE SUPPLY BOOSTER MEANS
Edmond K. Hatch, Brecksville, and Leon F. Miller, Rocky River, Ohio, assignors to The Osborn Manufacturing Company, Cleveland, Ohio, a corporation of Ohio
Original application Dec. 11, 1961, Ser. No. 158,499, now Patent No. 3,234,601, dated Feb. 15, 1966. Divided and this application Dec. 7, 1965, Ser. No. 512,066
3 Claims. (Cl. 164—173)

This invention relates generally, as indicated, to a molding machine with a universal squeeze board and more particularly to a highly versatile foundry molding machine capable of producing rapidly a variety of high quality foundry sand molds. This application is a division of application Serial No. 158,499, filed December 11, 1961, entitled "Molding Machine With Universal Squeeze Board," now Patent No. 3,234,601.

The present invention represents certain improvements in molding machines of the overhead squeeze type as, for example, the machine disclosed in our copending application, Serial No. 133,700, filed August 24, 1961, entitled "Overhead Squeeze Molding Machine," now Patent No. 3,169,285. In such application, there is disclosed a foundry molding machine wherein only the squeeze head as opposed to the squeeze ram is shuttled into and out of operative position. Such machine also incorporates an optional jolt action in an extremely fast cycle of operation.

With the machine of the present invention, a multiple piston squeeze head is employed wherein each of the pistons is manifolded to a pneumatic pressure system wherein a line pressure of, for example, 80 pounds per square inch can be boosted to as high as 400 pounds per square inch so that the optional jolt action can largely be dispensed with even for such molds as cylinder block molds. Also, such multiple piston squeeze head can be employed with large flasks to produce large molds and a uniform pressure can be obtained on such molds regardless of the pattern contour. Even with such complex molds as cylinder block molds, a uniform hardness is obtained. The machine of the present invention also employs a unique overhead draw mechanism which will quickly facilitate the drawing of the pattern from the mold and the discharge of the finished mold from the machine.

It is therefore an important object of the present invention to provide a versatile foundry molding machine which will apply a uniform high pressure to a variety of foundry sand molds regardless of pattern contour.

A further important object is the provision of a squeeze head for such foundry molding machines using a pneumatic pressure system wherein the line pressure can readily be boosted to and maintained at a preselected high pressure.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
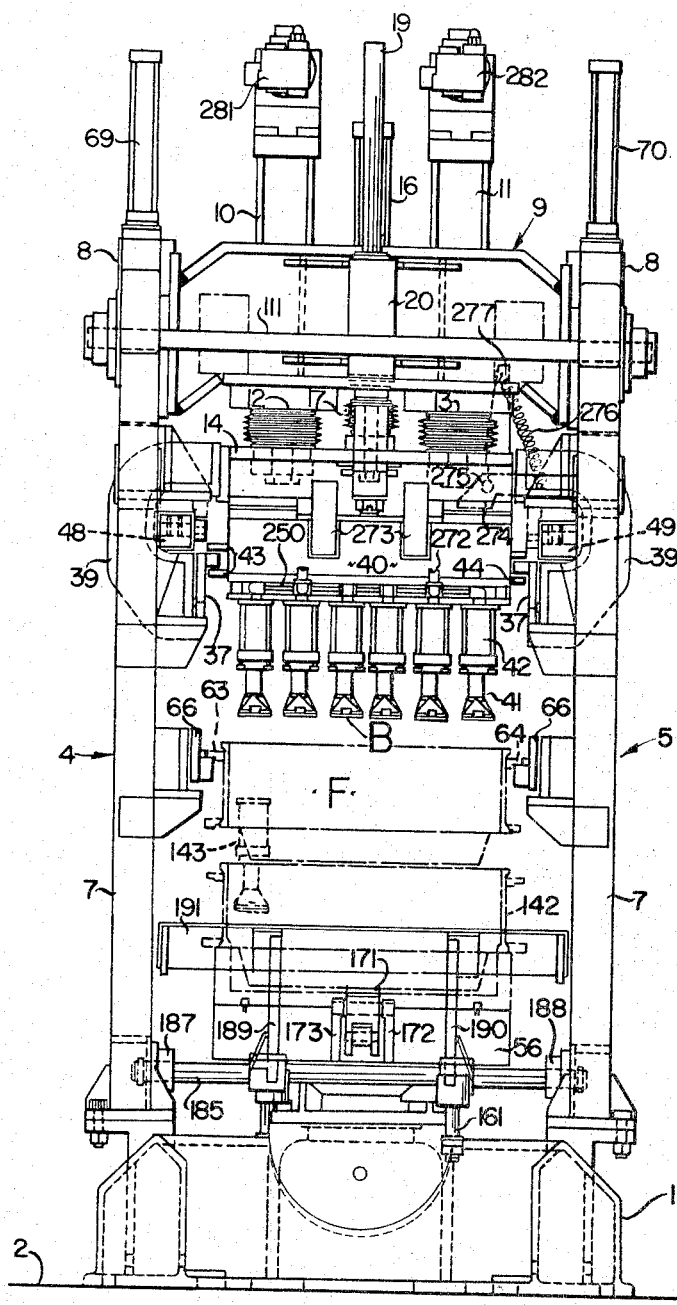
Figure 5:
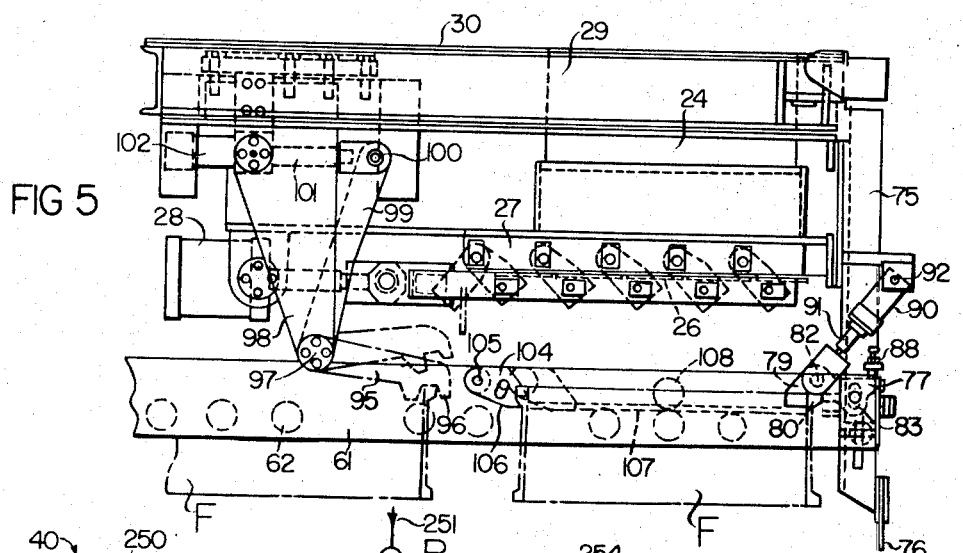
Figure 13:
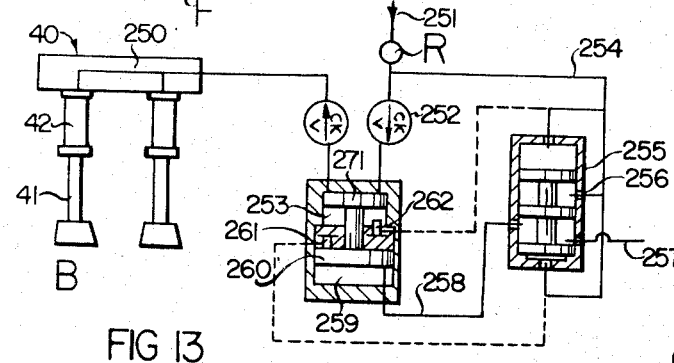
Figures 6, 12:
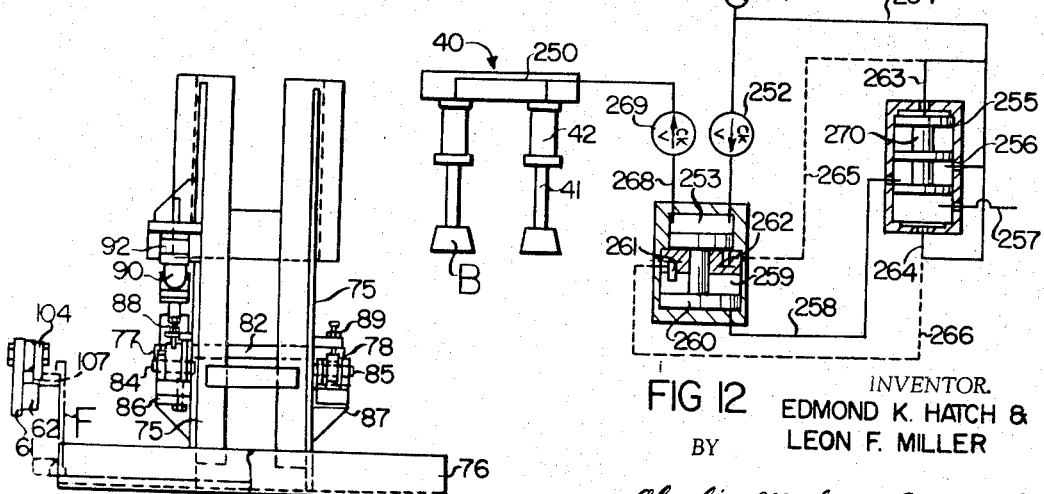
Figure 7:
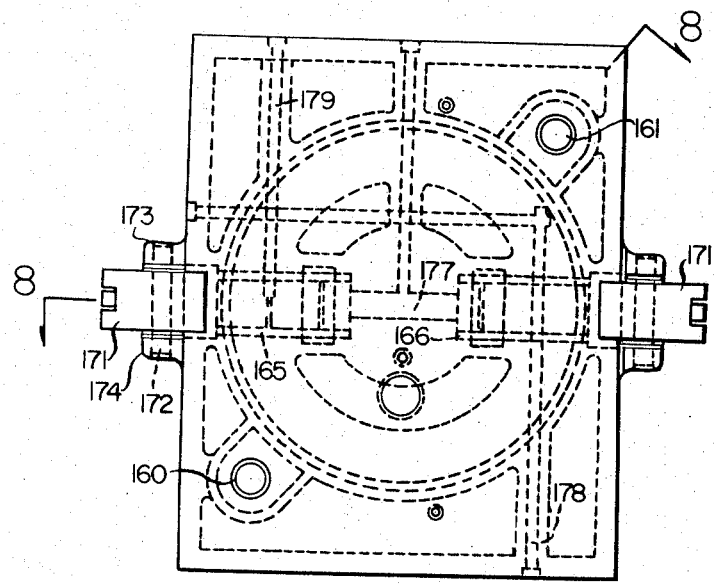
Figure 8:
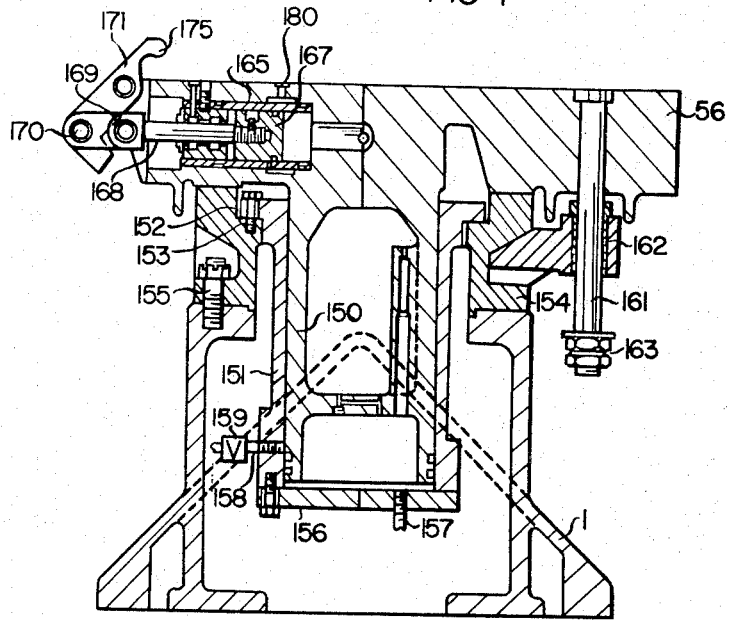

In said annexed drawings:
FIG. 1 is a side elevation of a machine in accordance with the present invention;
FIG. 2 is an end elevation of such machine as seen from the right in FIG. 1 on a somewhat enlarged scale;
FIG. 3 is an enlarged side elevation partially broken away of the overhead draw mechanism;
FIG. 4 is a side elevation of such draw mechanism partially broken away and in section;
FIG. 5 is an enlarged fragmentary side elevation illustrating the shuttling sand measuring box and the flask latching and feed mechanisms;
FIG. 6 is an end elevation of such mechanism of FIG. 5 as seen from the right thereof;
FIG. 7 is an enlarged top plan view of the jolt table of the present invention;
FIG. 8 is a vertical section of such table taken substantially on the line 8—8 of FIG. 7;
FIG. 9 is a fragmentary end elevation of an alternative form of pattern change mechanism that may be employed with the machine of the present invention;
FIG. 10 is a fragmentary horizontal section illustrating such pattern change mechanism;
FIG. 11 is a fragmentary side elevation of such pattern change mechanism;
FIG. 12 is a diagrammatic illustration of the pneumatic booster which may be employed with a squeeze head of the present invention; and
FIG. 13 is a similar diagram showing the booster in its alternate position.

Referring now to the annexed drawings and more particularly to FIGS. 1 and 2, the machine embodiment of the present invention illustrated herein comprises a base 1 mounted on a floor 2 with the base having bolted thereto as shown upstanding inverted U-shape side frames 4 and 5. Each side frame includes legs 6 and 7 and an arch top 8. The arch top portions 8 of each of the side frames 4 and 5 support therebetween an arch-like crosshead 9 of suitable welded plate framing as shown more clearly in FIG. 2. The crosshead 9 supports relatively large piston-cylinder assemblies 10 and 11, such piston-cylinder assemblies having relatively large diameter rods which are connected through boots 12 and 13 respectively to a vertically movable squeeze head supporting frame 14. Also mounted on the crosshead 9 is a somewhat smaller centrally disposed piston-cylinder assembly 16 used primarily for elevating the head, the relatively small rod of which is connected through boot 17 to the head 14. Guide rods 18 and 19 extending upwardly from the frame 14 pass through guide bushings 20 mounted on each end of the crosshead 9.

A sand fill chute or hopper 22 is also mounted on the head of the machine by means of brackets 23 as shown in FIG. 1. Molding sand may be fed into such hopper from any convenient overhead system such as a belt conveyor, not shown. Whereas the hopper 22 is held stationary, a sand measuring box 24 is mounted for horizontal longitudinal shuttling movement on a conveyor illustrated generally at 25. The bottom of the sand measuring box 24 is provided with louvers 26 mounted on vertically adjustable frame 27, such louvers being operated from an open to closed position and vice versa by piston-cylinder assembly 28. The sand measuring box 24 is mounted on a carriage frame 29 which includes a top cut-off plate 30, such frame being provided with transversely extending flange 31 which supports the frame including the measuring box on the rollers 32. The rollers 32 are mounted on the insides of a pair of rails 33 which are secured to the inside of the legs 6 of each of the side frames 4 and 5 by suitable brackets. The rails 33 and rollers 32 form one section of the discontinuous conveyor 25, the opposite end section being formed by rails 34 and rollers 35 similarly mounted by means of brackets 36 on the insides of the legs 7 of the frame members 4 and 5.

The center section of the conveyor is comprised of rails 37 having inwardly directed rollers 38 thereon which are mounted on the distal ends of pairs of U-shape side members 39 which are secured to the head frame 14 for vertical movement therewith. (Note FIG. 2.) It can now be seen that the conveyor 25 is discontinuous with the center section composed of the rails 37 and rollers 38 being carried for up and down movement with the squeeze head by the large vertical squeeze pistons of the piston-cylinder assemblies 10 and 11.

A squeeze head 40 which, in the illustrated embodiment, comprises a plurality of downwardly extending pistons 41 of piston-cylinder assemblies 42 is provided with pairs of side flanges 43 and 44, which form outwardly directed channels enclosing the rollers of the conveyor 25. The squeeze head 40 is connected to the sand box 24 by means of an upwardly directed U-shape member 45 on the head 40 which engages a pin 46 on the box 24 so that when the head and box are horizontally aligned, they will be locked together for movement along the conveyor 25 as a unit. Such movement is obtained by piston-cylinder assemblies 48 and 49, the rods of which are pin connected to brackets on the end of the sand measuring box carriage as indicated at 50. The cylinders are pivotally connected as shown at 51 to brackets 52 secured to the legs 6 of the side frame members 4 and 5.

The sand box 24 and squeeze head 40 when horizontally aligned are thus latched together for movement as a unit by the action of the piston-cylinder assemblies 48 and 49 and such are alternately placed one or the other over a centrally disposed jolt table and piston assembly indicated at 55. Such assembly includes a jolt table 56, which is shown in more detail in FIGS. 7 and 8, supporting a pattern plate 57 containing a pattern 58.

Flasks F are shuttled into the machine on a roller conveyor 60 which like the conveyor 25 is discontinuous. The conveyor 60 extends beneath the conveyor 25 and parallel thereto longitudinally of the machine and is comprised of a first section which includes rails 61 having inwardly directed rollers 62 thereon which engage beneath the side flanges 63 and 64 of the flasks F as seen more clearly in FIG. 2. The rails 61 may extend between the legs 6 of the side frames 4 and 5 and external support means generally indicated at 65 in FIG. 1. The center section of the conveyor 60 is comprised of rails 66 having inwardly directed rollers 67 thereon, such rails being mounted for vertical movement on pairs of brackets 68 (note FIGS. 3 and 4) which are connected to the rods of draw piston-cylinder assemblies 69 and 70 at the top of the machine as will hereinafter be described. The conveyor rails 66 like the conveyor rails 37 are thus vertically movable. The conveyor 60 is completed by a discharge section comprised of rails 71 having inwardly directed rollers 72 mounted thereon, such rails being secured by brackets or the like to the insides of the legs 7 of the side frame members 4 and 5. The rails 37 of the conveyor 25 as well as the rails 66 of the conveyor 60 are positioned in the center of the machine vertically aligned with the table 56 and the pattern 58 positioned thereon. It will be understood that the conveyor 60 may be only a small portion of a complete flask and mold handling system. The flask F may then be moved into the machine on conveyor 60 to be positioned on the rails 66 to be lowered by the draw piston-cylinder assemblies 69 and 70 onto the periphery of the pattern plate 57 which is clamped to the table 56.

Referring now to FIGS. 5 and 6, it will be seen that the carriage frame 29 for the sand box 24 which, it will be recalled, is mounted for horizontal shuttling movement on the conveyor 25 by means of the piston-cylinder assemblies 48 and 49, includes depending bracket members 75 which have mounted on the bottom ends thereof a strike-off plate 76. Such brackets 75 also pivotally support flask latching members indicated generally at 77 and 78 which include hook portions 79 (note FIG. 5) which engage over the top peripheral leading edge of the flask as shown at 80. The latch members 77 and 78 are interconnected by a shaft 82. The proximal ends of the latch members 77 and 78 are provided with vertically extending elongated slots 83 which receive pins 84 and 85 passing through upstanding ears on brackets 86 and 87 (note FIG. 6). Adjustable stop screws 88 and 89 engage the tops of the latch members to limit the counterclockwise pivotal movement thereof as viewed in FIG. 5. The latch members are operated by a piston-cylinder assembly 90, the rod 91 of which is connected to the latch member 77. Such piston-cylinder assembly may, for example, be a relatively small assembly having a 2½ inch bore with a 2½ inch stroke and cushioned at both ends. Extension of such piston-cylinder assembly will pivot the latch members in the counterclockwise direction about the pins 84 and 85 to engage the top peripheral edge of the leading end of the flask F and when such piston-cylinder assembly is extended, the flask will be latched for movement with the carriage 29 in a position vertically aligned with the sand box 24. The blind end of the piston-cylinder assembly 90 is pivoted as indicated at 92 to one of the vertical brackets 75.

The carriage 29 may also be employed to move a flask into position where it can be engaged by the latch members 77 and 78. This is accomplished by the latch member 95 having bifurcated tip 96 which, like the latch members 77 and 78 engages the leading top edge of the flask. The latch member 95 is pivoted at 97 to a depending bracket 98 and includes an arm 99, the distal end of which is pivoted at 100 to the rod 101 of piston-cylinder assembly 102 which is mounted beneath the carriage frame 29. Thus retraction of the piston-cylinder assembly 102 and the rod 101 will pivot the arm 99 and the latch member 95 in a counterclockwise direction as viewed in FIG. 5 so that the bifurcated tip will be vertically clear of the top edge of the flask. When extended, the bifurcated tip will engage the flask edge and the flask F will thus be locked for movement with the carriage 30. Latch members 104 pivoted to the rails 61 as at 105 are provided with a bottom sloping cam surface 106 which engages and rides over the top flange 107 of such flasks and drops behind such flanges when the flask is in the right-hand position shown in FIG. 5 so that the flask will be held in vertical alignment beneath the sand box 24 to be engaged by latch members 77 and 78.

Thus as the carriage 29 is moved by the piston-cylinder assemblies 48 and 49, the leading flask F will be positioned on the rollers of rails 66 aligned with the pattern 57. The rails 66 are then lowered to place the flask F on the pattern by means of the draw piston-cylinder assemblies 69 and 70. Such lowering of the rails and flasks supported thereby will then automatically disengage the flask from the latch members 77 and 78. Retraction of the piston-cylinder assembly 90 as well as the retraction of the piston-cylinder assembly 102 will release both latch mechanisms and as the carriage 29 is returned to its original position, the latch members 77 and 78 will now be in position to engage the leading top edge of the next succeeding flask when the piston-cylinder assembly 90 is extended. Similarly, the latch member 95 will be in position to engage the next succeeding flask F again to latch two flasks for movement in tandem with the carriage 29. A hold down roller 108 may be employed to assist in securing the flask F in position vertically beneath the sand box 24.

Referring now more particularly to FIGS. 3 and 4, it will be seen that the rails 66 forming the center section of the conveyor 60 are mounted for vertical uniform movement by means of the draw piston-cylinder assemblies 69 and 70, the rods 110 of which are each connected to a squaring shaft 111 by means of the linkage 112 shown more clearly in FIG. 3. One end of the link 112 is pin connected to a clamp 113 on the rod 110 and the other end is pin connected to arm 114 which is keyed to shaft 111. A similar arm and linkage will connect the opposite end of the shaft 111 to piston-cylinder assembly 70. Since the draw mechanisms for each side of the machine operated by the respective piston-cylinder assemblies 69 and 70 will be allochirally identical in form, only the draw mechanisms for the piston-cylinder assembly 69 will be described in detail. The lower end of the rod 110 is provided with a threaded portion 114 having a stop nut 115 thereon which will engage plate 116 in the uppermost position of the rod 110. Accordingly, the nut 115 may be employed as an adjustment to obtain the proper height of rail 66 in the uppermost position. The distal end of the rod 110 is provided with a reduced diameter threaded portion 117 and nuts 118 and 119 may be employed to clamp such rod to the top web 120 of a guide frame 121. The guide frame 121 is comprised of two cylindrical bushing members 122 and 123 which slide along vertically extending guide rods 124 and 125 respectively. Such guide rods are secured as by screws 126 in cylindrical receptacles 127 and 128 welded or otherwise rigidly fastened to the bottom of the arch or top portion 8 of the side frame 4. The lower ends of the guide rods 124 and 125 are secured in a cross frame member 130 extending between the legs 6 and 7 of the side frame member 4. This cross frame member may be of the welded plate configuration shown more clearly in FIG. 4. A stop bolt 131 may be secured in a bottom web 132 in the guide frame 123 and the engagement of this bolt with an upstanding projection 133 on the frame 130 will govern the bottom or lower extent of movement of the rod 110.

The brackets 68 for the conveyor rails are secured to each of the bushing members 122 and 123 and adjusting screws 135 may be employed to adjust the vertical height of the brackets with respect to the bushing members. The brackets are provided with inturned bottom edges 136 which support the rails 66 thereon. Such brackets also mount vertically extending cushioning dashpot assemblies 137, the rods 138 of which in the retracted position are beneath the top level of the rollers 67. In the extended position, the rods serve to lift the flask slightly off the rollers 67. Such brackets also support a small horizontal axis piston-cylinder assembly 140, the capped piston-rod end of which, when in the extended position, engages against the flask flange 63 during the drawing operation to stabilize the flask and to keep the flask from rolling after the flask is drawn and to keep it from rolling when first lowered onto the pattern prior to the molding operation. It is noted that in the illustrated embodiment, four piston-cylinder assemblies or dashpots 137 are employed for each rail 66, the outer ones being supported on brackets 141.

Now with special reference to FIGS. 1, 2 and 4, it will be noted that the extent of vertical movement of the draw rails 66 and rollers 67 mounted thereon and accordingly the flask F is shown in such figures at 142. In such lower position, the flask will be then transferred vertically downwardly from the conveyor 60 to rest upon the top of the pattern plate 57 which together with the flask and pattern 58 forms a completed mold box. Extension of the squeeze piston-cylinder assemblies 10 and 11 will lower the head frame 14 and thus the squeeze head 40 to position the rods 41 and cylinders 42 in the phantom line position shown at 143 in FIG. 2 with the feet or squeeze biscuits B of the piston rods well within the peripheral top of the flask now positioned on the pattern plate. As seen in FIG. 4, the U-shape side frames 39 will move downwardly to approximately the phantom line position indicated at 144.

Referring now to FIGS. 7 and 8, it will be seen that the table 56 includes a central depending piston 150 which fits within cylinder 151 which is provided with a top flange 152 bolted to shoulder 153 of adaptor 154. The adaptor is, in turn, bolted to the base 1 as indicated at 155. The bottom of the cylinder 156 may be provided with an inlet indicated diagrammatically at 157 so that air under pressure can be admitted to the bottom of the piston 150 which will elevate the piston and thus the table 56. An exhaust port 158 may be provided with a shut-off valve 159 which will normally be opened to permit the jolt operation. Air under considerable pressure will be admitted to the bottom of the piston to raise the piston and the table until the exhaust port is clear at which time the air behind the piston will be exhausted permitting the table to drop providing the jolt action. Guide rods 160 and 161 provided at diametrically opposite corners of the table extend through bushings indicated at 162 to keep the table from rotating about its central axis. Such guide rods may be provided with stops 163 limiting the upper movement of the table and it will be understood that safety exhaust ports may also be provided. The jolt piston is generally conventional and may be employed optionally in the cycle of the machine.

The top of the table 56 is provided with two diametrically opposite cylinders 165 and 166, each being provided with a piston shown at 167. The rods 168 of such pistons are pivoted to a clevis 169 which is in turn pivoted at 170 to a clamping member 171, such clamping member being pin connected at 172 to lugs 173 and 174 on the edge of the table 56. The top end of the pivotally mounted clamp 171 is provided with a finger or tip portion 175 which engages over a bottom flange 176 on the pattern 57. T-shape passage 177 provides an inlet port for the blind ends of the cylinders 165 and 166 and passages 178 and 179 provide air pressure inlet ports for the rod ends of such cylinders. Exhaust port 180 is provided for each of the cylinders through the top as indicated. Thus each of the piston-cylinder assemblies in the table 56 is double-acting so that the clamp members 171 can quickly be pivoted to and from pattern plate clamping position so that such patterns can readily be removed from and secured to such table.

To facilitate such pattern changes, the machine embodiment of FIG. 1 is provided with two transversely extending shafts 185 and 186 which are supported for rotation in bearings 187 and 188 at each end thereof. The shafts are positioned at each side of the table 56 and each such shaft has mounted thereon two arms 189 and 190 supporting rails 191 and 192 having a series of horizontally aligned rollers 193 and 194 thereon. These respective rails and rollers form a pattern change conveyor which can be spread apart by pivoting oppositely the arms about the axes of the shafts 185 and 186. Suitable stops may be provided to maintain the arms and conveyor sections in the position shown in FIG. 1, for example. When it is desired to change the pattern, the shut-off valve 159 may be closed and this then closes the jolt exhaust port and admission of air under pressure to the blind end of the cylinder will elevate the table and thus the pattern plate and pattern. When the pattern plate is sufficiently elevated, the rollers 193 and 194 may be manually pushed inwardly or toward each other to fixed stops. The clamping pistons 167 in the table 56 will now be retracted to release the clamps 171. In this position, the rollers will be beneath side flanges 196 and 197 on the pattern plate and when air has been exhausted from beneath the jolt piston by opening valve 159, for example, the pattern plate will rest upon the rollers and further lowering of the table will release the pin and bushing connection between the table and pattern plate. A new pattern may then be shuttled into place and the procedure reversed.

In FIGS. 9 to 11, there is shown an embodiment of the invention wherein a more automatic pattern change is employed. Such machine may comprise, for example, a base 200 with columns 201, 202, 203 and 204 being the legs of the arch-like side frames which support the crosshead in the same manner as in FIGS. 1 and 2. The base is centrally provided with the jolt and elevating table 205 which may be identical in form to the table disclosed in FIGS. 7 and 8. The machine, itself, may be substantially identical in form and operation to the machine disclosed in FIGS. 1 and 2. In this machine, however, a pattern change frame is provided which includes side rails 208 and 209 each having a plurality of rollers 210 and 211 thereon which project inwardly and support a plurality of patterns indicated diagrammatically at 212, 213 and 214. The patterns 212 through 214, like the pattern plate in the FIG. 1 embodiment, are provided with top side flanges indicated at 215 and 216 in FIG. 9 by which the patterns are supported on the rails for movement therealong. The frame also includes a transverse plate 217 and a pivot shaft 218 at opposite ends thereof, the plate being supported on a frame 219 which is pivotally connected at 220 to the rod of vertically extending piston-cylinder assembly 221. The shaft 218 may be pivoted in pillow blocks 223 and 224 which are mounted on stand 225 positioned adjacent the machine frame. Similarly, the piston-cylinder assembly 221 may be mounted in a stand 226 positioned at the other side of the machine frame.

Mounted on brackets 228 and 229 on the rails 208 and 209 are long stroke piston-cylinder assemblies 230 and 231. The rods of these piston-cylinder assemblies are connected by links 232 and 233 to guide rods 234 and 235 respectively. Each guide rod is mounted in bushings 236 and 237 secured by brackets to the respective rails. Latch members 240 and 241 may be secured to such guide rods for movement therewith as by the set screws or the like shown in FIG. 10. Such latch members include lugs 242 and 243 engaging cooperating lugs on the ends of, for example, the patterns 213 and 214 respectively. Accordingly, extension of the rods of the piston-cylinder assemblies 230 and 231 will move the patterns 213 and 214 as a unit along the rails 208 and 209 when the piston-cylinder assembly has been extended to pivot the entire frame about the axis of pivot shaft 218 to elevate, for example, the pattern 213 to disconnect the pin-bushing connection between the pattern and the table. When the piston-cylinder assembly 221 is retracted, the selected pattern will be engaged with the pin-bushing connection in the table and the patterns on either sides thereof will be engaged by adjustable screws 244 and 245 in the stand 225 and such screws 246 and 247 in the stand 226. These screws serve to elevate the patterns from the rollers 210 and 211 on the rails when the frame is in its lowermost position and this precludes the patterns from rolling from their selected positions during the cycle of operation of the machine. It should be here noted that with such automatic pattern shuttle, the machine is able to operate to change patterns for every cycle. It will be understood that the rails 208 and 209 can be continuations of additional conveyor systems so that pre-selected patterns may be placed in order and fed to the machine to be automatically positioned by the pattern shuttle mechanism above described so that a variety of molds can be made continuously on the same machine by careful programming. In the illustrated embodiments, the direction of pattern travel will be normal to the direction of flask and head travel.

Referring now to FIGS. 12 and 13, it will be seen that the universal multiple piston-squeeze head shown diagrammatically at 40 is provided with a manifold 250 so that the blind end of each of the downwardly extending cylinders 42 are connected to a common source of air pressure.

Air is supplied to the squeeze head from a normal plant line pressure supply indicated at 251 which may, for example, be at approximately 80 pounds per square inch. Air will be supplied from such source through a conventional pressure regulator R to pass through a check valve 252 into a small booster cylinder 253. Air at such regulated pressure also enters a branch line 254 to pass into a conventional pilot operated three-way directional valve 255. The inlet port for such valve is shown at 256 and the exhaust port is shown at 257. As seen in FIG. 12, the directional valve in the position shown connects the branch line 254 with a line 258 leading to the bottom of a large booster cylinder 259. The booster than comprises the two different size cylinder chambers 253 and 259 interconnected by a double piston ram 260. Small button valves 261 and 262 in the booster operate to relieve the air pressure from the pilots 263 and 264. When the piston 260 moves to the down position, button valve 262 will relieve top pilot 263 through line 265, the bottom pilot 264 of the valve 255 being under pressure. The relieving of pilot 264 is accomplished through pilot line 266. With the valve in the up position, line 254 is connected to line 258 and continued pressure acting on the larger area of the bottom piston of ram 260 in cylinder 259 of the booster causes the booster ram to rise and force air within the cylinder chamber 253 out passage 268 through check valve 269 into the manifold 250. As the ram 260 rises, it will engage the button valve 261 relieving pilot line 266 causing the spool 270 of the directional valve to shift to the FIG. 13 position now venting the chamber 259 through the line 258 and the exhaust port 257. Air then passing from source 251 through the check valve 252 into the chamber 253 behind piston 271 will force the booster ram down. Continued oscillation of the booster ram up and down will increase the air pressure in the manifold from, for example, 80 pounds per square inch to over 400 pounds per square inch and when the desired pressure has been reached, the booster will then stall. The point at which the booster stalls will be determined by two factors, viz, the setting of valve R and the difference in area of the two pistons of ram 260. Any leakage in the piston-cylinder assemblies 42 or in the manifold will cause the pressure in the manifold to drop and the booster again to operate until the loss of pressure is restored. Several strokes of the booster ram up and down may be required to increase the manifold pressure to the desired point.

Variable pressures may be obtained on the sand by adjusting the pressure in the system for the overhead squeeze pistons 10 and 11 which force the head down into engagement with the sand in the mold box. It will be understood that the squeeze biscuits or feet B may vary in size, spacing and shape so that barred flasks, for example, may be accommodated. In any event, the head being separately mounted on the conveyor 25 may easily be disconnected from the carriage frame 29 for replacement or repair purposes. The line 268 may be connected to the manifold as shown at 272 in FIG. 2.

With continued reference to FIG. 2, it will be seen that stop plates 273 and 274 may be provided accurately to position the head 40 within the frame 14 and a swingable latch 274 at the opposite end of frame 14 may be provided automatically to swing into position about the pivot 275 as the head is lowered automatically to latch the head 40 in the proper vertically aligned position. A spring 276 connected to a stanchion 277 may be employed automatically to swing the latch into proper latching position as the head is lowered. When the head is raised, the latching member will be caused to engage an abutment on the frame to swing clear to the position shown in FIG. 2 so that the head may then be replaced by the sand box by means of the piston-cylinder assemblies 48 and 49.

The universal squeeze head 40 which rides into and out of the frame 14 with the shuttle of the sand box comprises a multiplicity of downwardly projecting pistons having feet B on the lower or distal ends thereof which engage the sand as the piston-cylinder assemblies 10 and 11 are extended to lower the frame and thus the head into sand engagement. The pistons 41 which are backed by a manifolded air pressure system are then able to adjust relative to each other transferring squeeze pressure from one cylinder to another although the pressure in each cylinder will remain equalized so that each foot B engaging the sand will exert the same amount of pressure on the sand within the flask.

OPERATION

Referring now mainly to FIGS. 1 and 2, it will be seen that the louvered sand measuring box 24 in the position shown will receive loose fluffy sand falling from the hopper 22. Beneath the box 24 on the conveyor 60 a flask F has been engaged by the latches 77 and 78 as seen in FIG. 6 to be in effect locked for movement with the box 24. A preceding flask F will also be latched for movement with the box by the latch member 95. With the squeeze head 40 and the squeeze head frame 14 in up position and also the draw piston-cylinders 69 and 70 in the up position and further with the jolt table down and a selected pattern clamped thereon, fluid pressure is now applied to the blind ends of the large horizontal shuttling cylinders 48 and 49 which laterally shift the sand box 24 and the head 40 to bring the sand box over the pattern and to shift the head out onto the extended end of the conveyor 25 formed by the rails 34. Movement of the sand box in this manner brings a cut-off plate 30 into position beneath the hopper 22. This shuttling movement of the box and head also brings a flask into the proper position and if a mold has been made on the previous cycle, it would also simultaneously push out the completed mold on the extended section 71 of the conveyor 60 as shown at 280.

As soon as the flask has been brought into position over the pattern, the draw piston-cylinder assemblies 69 and 70 are energized by suitable limit switches, for example, to move the rails 66 downwardly which now support the flask and place such flask on the pattern plate. When down, the mold box is then assembled and the louvered box opens to discharge the sand charge onto the pattern in the flask. At this point, at the option of the operator, the jolting can begin and simultaneously the latch member 95 will release the next flask to be engaged by the latch memebrs 77 and 78, now in their raised position due to retraction of piston-cylinder assembly 90, and the retraction of the piston-cylinder assemblies 48 and 49 will return the sand box 24 to its original position and replace the sand box over the flask with the universal squeeze head 40. With the louvers closed, the sand measuring box 24 is now in position to be refilled. Surplus sand will be struck from the mold box by the strike-off plate 76 as the sand box is returned. The latch member 95 will now be pivoted in a clockwise direction to engage the next preceding flask.

At the completion of the jolt cycle, the large overhead squeeze cylinders 10 and 11 are now supplied through valves 281 and 282 with oil under high pressure to lower the frame 14 and the universal squeeze head. Oil may also be supplied to the blind end of piston-cylinder 16 to increase the squeeze pressure. When the head 40 is brought into position in the frame 14, the plate 273 will engage the frame properly to center the head and the latch 274 will pivot into position as the head starts to lower locking the head in the properly centered position in the frame 14. The booster shown in FIGS. 12 and 13 has previously been set to create and maintain a high pressure in all of the relatively small piston-cylinder assemblies 42 and as the feet or squeeze biscuits B on the rods 41 engage the sand and begin to compress the air within the manifolded system, the fluid is then increased in pressure and each piston will move upwardly or retreat according to the resistance it encounters. In this manner, a desired equalization takes place so that each squeeze biscuit will exert the same pressure on the sand. The fluid supply system for the piston-cylinder assemblies 10 and 11 may be provided with a pressure responsive mechanism so that when the desired pressure is reached, the head is raised. Since the piston-cylinder assemblies 10 and 11 are provided with relatively large rods, the rod ends of the pistons therein have a relatively small area and the smaller piston-cylinder assembly 16 can be employed to assist in raising rapidly the head 40 and the frame 14. When the head is raised, the valves 281 and 282 will be opened fully to exhaust rapidly the fluid from the tops of the piston-cylinder assemblies 10 and 11. Immediately following the raising of the head, the draw piston-cylinder assemblies 69 and 70 will be retracted to raise the flask and the thus formed sand mold stripping the mold from the pattern. The small horizontal cylinders 140 will press in on the flask flange to keep it steady during the drawing operation.

As soon as the mold has been stripped from the pattern, the pattern shuttle mechanism shown more clearly in FIGS. 9 through 11 may be employed to change patterns. After the pattern has been unclamped by the piston-cylinder assemblies shown more clearly in FIGS. 7 and 8, the piston-cylinder assembly 221 may be extended to pivot the frame to lift the patern 213 clear of the pin-bushing connection with the table. When the pattern is clear, the piston-cylinder assemblies 231 and 232 may be employed to shuttle into operative position the next pattern. When properly positioned, the piston-cylinder assembly 221 is retracted and the pistons in the table are extended firmly to latch the selected pattern in place. With the embodiment shown in FIG. 1, the rails 191 and 192 may manually or automatically be pushed into position after the pattern has been unlatched and the jolt table 56 raised so that the flanges 196 and 197 will overlie the rollers 193 and 194 when thus positioned. With the new pattern in position, the machine is then ready to commence the next cycle of operation.

With the present construction, not only are the squeeze piston-cylinder assemblies 10 and 11 on top of the machine away from the sand and dirt, but also the draw piston-cylinder assemblies 69 and 70. Moreover, the squaring shaft linkages for the draw pistons are enclosed within the side frame top portions 8.

It can now be seen that there is provided a highly versatile foundry molding machine which will quickly produce a variety of molds including large molds with large flasks squeezing the sand therein to a uniform hardness.

Other modes of applying the principles of the invention may be employed, change being made as regards the details described, provided the features stated in any of the following claims or the equivalent of such be employed.

We, therefore, particularly point out and distinctly claim as our invention:

1. A squeeze head for foundry molding machines comprising a plurality of resiliently cooperatively movable sand engaging pneumatic squeeze members, manifold means interconnecting said pneumatic squeeze members operative to maintain the sand squeeze pressure exerted by each member the same, and air pressure booster means operative to control and maintain the degree of such sand squeeze pressure exerted by said members as a whole, said booster means comprising a ram having two pistons of different area, and valve control means for said booster means operative to reciprocate said ram to pump air into said manifold means.

2. A squeeze head as set forth in claim 1 wherein said valve control means comprises a pilot operated three-way valve, said pilot operated valve being controlled by reciprocation of said ram to bring the pressure in said manifold to a predetermined degree.

3. A squeeze head as set forth in claim 2 including means responsive to a deficiency in the pressure in said manifold means to commence operation of said booster means and to the attainment of such predetermined pressure to halt operation of said booster means.

References Cited
UNITED STATES PATENTS

| | | | |
|---|---|---|---|
| 2,351,872 | 6/1944 | Parker | 60—54.5 |
| 2,536,881 | 1/1951 | Lytle | 60—52 |
| 2,938,347 | 5/1960 | Sturgis | 60—52 |
| 3,123,873 | 3/1964 | Taccone | 164—171 |
| 3,169,285 | 2/1965 | Hatch et al. | 164—196 |
| 3,220,066 | 11/1965 | Hatch et al. | 164—173 |
| 3,234,601 | 2/1966 | Hatch et al. | 164—173 |
| 3,267,528 | 8/1966 | Ellms | 164—212 |

J. SPENCER OVERHOLSER, *Primary Examiner.*
R. D. BALDWIN, *Assistant Examiner.*